(No Model.) 2 Sheets—Sheet 1.
J. ZELIFF.
CAR STARTER.
No. 381,602. Patented Apr. 24, 1888.
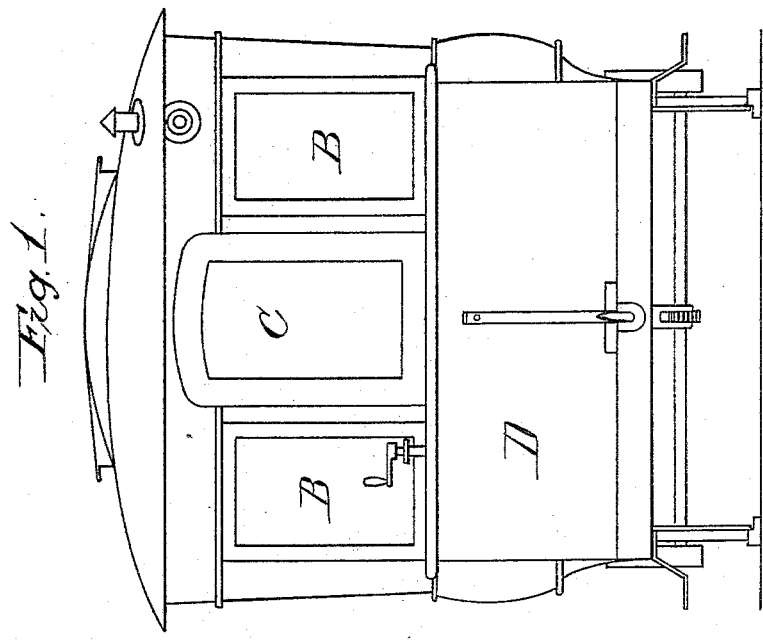
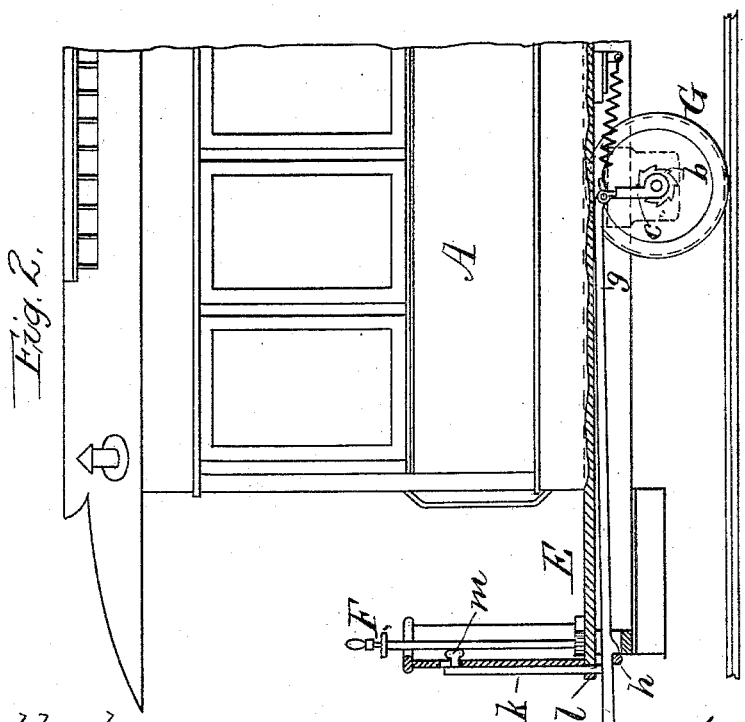

(No Model.) 2 Sheets—Sheet 2.
J. ZELIFF.
CAR STARTER.
No. 381,602. Patented Apr. 24, 1888.
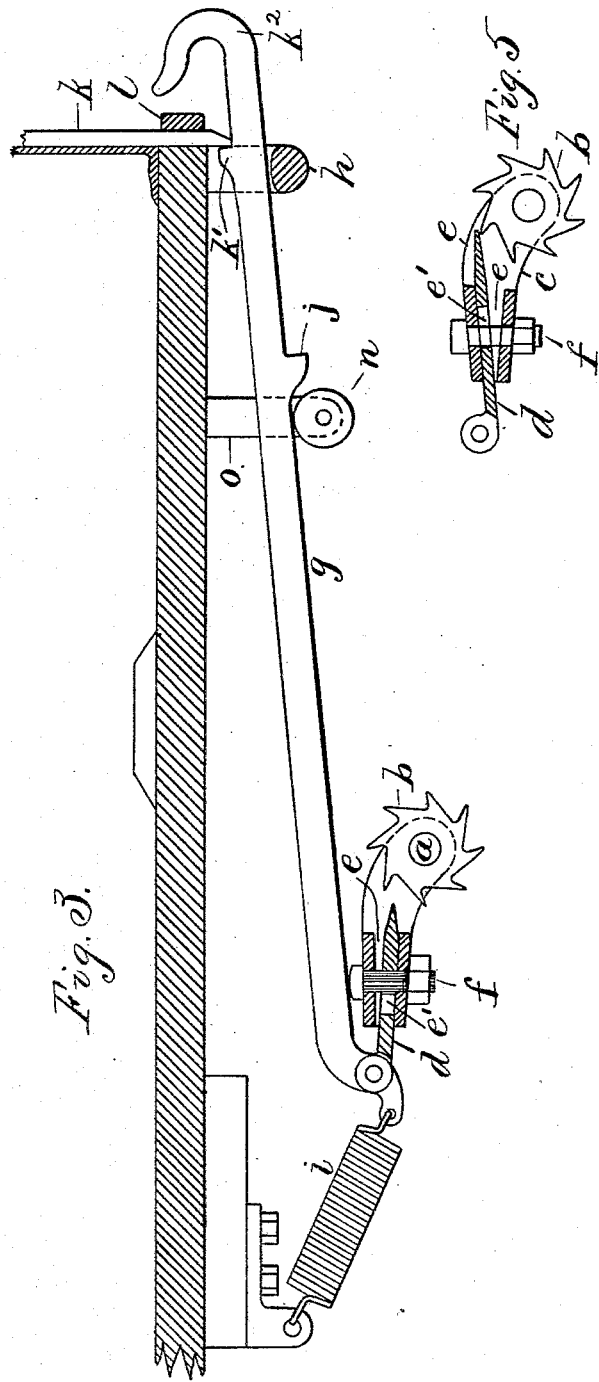
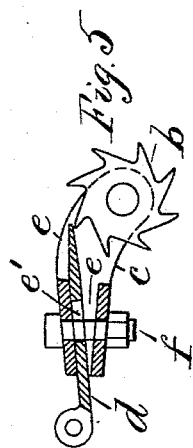
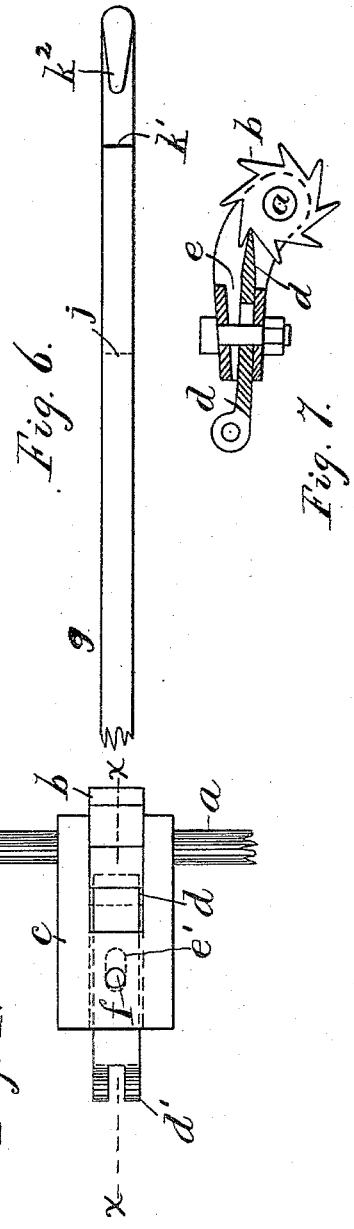
Attest:
L. Lee.
F. C. Fischer.
Inventor.
James Zeliff, Jr.
Crane & Miller, Atty

UNITED STATES PATENT OFFICE.

JAMES ZELIFF, OF NEWARK, NEW JERSEY, ASSIGNOR OF ONE-HALF TO LILLIAN LEMASSENA, OF SAME PLACE.

CAR-STARTER.

SPECIFICATION forming part of Letters Patent No. 381,602, dated April 24, 1888.

Application filed June 15, 1887. Serial No. 241,334. (No model.)

*To all whom it may concern:*

Be it known that I, JAMES ZELIFF, a citizen of the United States, residing at Newark, Essex county, New Jersey, have invented certain new and useful Improvements in Vehicle-Starters, which are fully described and represented in the following specification and the accompanying drawings, forming a part of the same.

The object of this invention is to furnish a temporary connection between the draw-bar of the car and the axle by means of a pawl and ratchet and a lever proportioned to propel the car through a less distance than the movement of the draw-bar, and to thereby increase the leverage of the motive power to ease the strain upon the horses when starting the car. In the devices employing a pawl and ratchet for this purpose the pawl has been normally pressed into the teeth of the ratchet-wheel, and has required some device to withdraw it therefrom when the car was backed or when the device was not in use. Thus in United States Patent No. 234,121 the pawl is pressed normally toward the wheel by a spring, G, and a stationary wedge, F, is employed to retract the pawl. In United States Patent No. 345,281 the pawl is pressed normally into the wheel by its own weight, and can be retracted only by a cord or chain pulled by the driver, and in United States Patent No. 306,121 a sliding bolt is used to hold the pawl out of contact with the ratchet-wheel, when desired.

My invention differs from all of those cited, first, in that the pawl is movable both laterally and longitudinally in a socket, and is held normally out of contact with the ratchet-wheel by a spring, and, secondly, that the tension applied to the draw-bar operates against the force of the spring to slide the pawl into contact with the ratchet-teeth and to thereafter rotate the ratchet-wheel until the draw-bar is arrested by a stop. The pawl moves laterally in its socket to clear the ratchet-teeth during the continued forward movement of the teeth. When the car is backed, the tension of the spring operates first to retract the draw-bar and to thus withdraw the pawl from the ratchet-teeth, so as to wholly clear the latter before the axle is turned backward.

I hereby disclaim the patents referred to above and any construction different from that described and claimed herein.

In the drawings, Figure 1 is an end view of a horse-car provided with my improvements. Fig. 2 is a side view of the front end of the car with the nearer pedestal and wheel removed from the axle and the platform and dash-board shown in section with part of the car-floor. Fig. 3 is a vertical section of the car-floor and platform, upon a larger scale, with the starting-fixtures attached thereto, the parts where hatched being shown in longitudinal section at their center line, as the line $x\,x$ in Fig. 4. Fig. 4 is a plan of the pawl, the lever, the ratchet-wheel, and a part of the car-axle. Fig. 5 is a view similar to that shown in Fig. 3 of the ratchet-wheel, the lever, and the pawl, the lever and pawl being sectioned on line $x\,x$ in Fig. 4; and Fig. 6 is a plan of the draw-bar in the same relation to the pawl and lever as is shown where the parts are connected in Fig. 3. Fig. 7 is a view similar to Fig. 5, with the pawl and ratchet engaged.

A is the side of the car; B, the end of the car; C, the door, and D the dash-board.

E is the floor of the car-platform, upon which the driver stands; F, the hand-crank for operating the ordinary brake.

$a$ is the front axle of the car, carrying the wheels G; $b$, a ratchet-wheel secured thereon; $c$, a forked lever hinged upon the axle at each side of the wheel $b$, and formed with a longitudinal socket, $e$, in which is fitted a pawl, $d$, having slot $e'$. A bolt, $f$, is passed through the socket vertically and through a slot, $e'$, in the pawl, and permits the movement of the pawl forward just far enough to engage beneath the teeth of the ratchet-wheel, which are uncut for such purpose and the pawl tapered to slide freely therein.

The socket $e$ is formed with sufficient vertical space to permit the point of the pawl to be lifted by the rotations of the ratchet-wheel and to clear the same when the wheel is in continuous motion. The rear end of the pawl is formed with fork $d'$, and the draw-bar $g$ is pinned therein and passed through an eye, $h$, at the front end of the platform.

A spring, $i$, is attached to the floor of the car and to the rear end of the draw-bar, and operates normally to hold the draw-bar and the pawl backward, so that the ratchet-wheel may be turned in a reverse direction without interference when the car is backed. A stop, $j$, is affixed upon the draw-bar to limit its forward motion, and a latch, $k$, is fitted in a guide, $l$, upon the front end of the platform, to engage a stud, $k'$, upon the upper side of the draw-bar near the hook $k^2$. The latch is provided with a handle, $m$, at its upper end within reach of the driver, and when lifted permits the draw-bar to move forward as the horses pull to start the car, as in Fig. 2; but when dropped, as in Fig. 3, it prevents the operation of the starting devices and retains the hook $k^2$ in a fixed relation to the platform.

The operation of the device is as follows: The latch being lifted, the spring $i$ holds the draw-bar and the lever normally backward, as shown in Fig. 3, and the first pull of the horses operates against the tension of the spring to pull the pawl forward in the socket $e$ into engagement with the ratchet-wheel, as shown in Fig. 3, and the subsequent movement of the draw-bar then tends to turn the lever and ratchet-wheel around into the position shown in Fig. 2, thus rotating the front axle, $a$, and positively turning the car-wheels G upon the track. When the car is set in motion, the rotation of the wheel $b$ operates to lift the pawl into the position shown in Fig. 5, and the pawl being prevented from moving forward by the bolt $f$, the teeth of the ratchet-wheel thereafter clear the end of the pawl without any obstruction therefrom. As the traction upon the draw-bar after the car has started is less than that at first required, the spring $i$ operates to draw the lever backward, as to the position shown in Fig. 3, and such movement also operates to retract the pawl in the socket, where its point is entirely clear from the ratchet-teeth. The bar may then, if desired, be locked by dropping the latch $k$ when the stud $k'$ is inside the same, as shown in Fig. 3, and the car thereafter operates independently of the starting mechanism, and the ratchet-wheel $b$ may turn in either direction without obstruction from the pawl.

In Fig. 3 a roller, $n$, is shown mounted beneath the draw-bar in a hanger, $o$, and operates to diminish the friction of the bar in the eye $h$. The roller is arranged below the level of the eye $h$ and nearer to the forward than the rear end of the draw-bar, so that the weight of the rear end may overbalance the forward end. The bar $g$, when resting thereon, is therefore in a slanting position, and tends normally to slide backward, as is desired. The spring $i$ operates to maintain a slight pressure upon the draw-bar $g$ when the animals first pull thereon, and the strain developed by the engagement of the pawl with the ratchet-wheel is not, therefore, transmitted suddenly to the animals, but is felt with the augmented tension of the spring $i$ as a gradually-increasing load, to which the animals' muscles are gradually adapted. The whole device thus operates to bring the strain upon the animals gradually, as well as to apply their force in the most advantageous way to the starting of the car.

It is immaterial whether the draw-bar be attached directly to the pawl or not, as a chain or other flexible connection would operate precisely the same and transmit the tension of the spring to the draw-head, as desired. The draw-head would also operate through the chain to press the pawl into the ratchet-teeth and to rotate the lever $c$ in the desired manner.

The essential feature of my construction is the pawl held normally out of contact with the ratchet-teeth and pressed thereto automatically by the tension upon the draw-bar.

From the above description it is obvious that my invention may be applied to other vehicles than the variety shown herein—such as railroad-cars and wagons—and I do not, therefore, limit myself to its application to horse-cars only.

Having thus set forth the nature of my invention, what I claim is—

1. In a vehicle-starter, the combination, with a ratchet-wheel affixed to the axle, of a lever pivoted upon the axle and provided with a longitudinal socket, $e$, a sliding pawl fitted within said socket to engage the teeth of the ratchet-wheel, a draw-bar connected with the rear end of said pawl, and a spring operating to retract the draw-bar and pawl and to thus hold the pawl normally out of the ratchet-teeth, as and for the purpose set forth.

2. In a vehicle-starter, the combination, with a ratchet-wheel affixed to the axle, of a lever pivoted upon the axle and provided with a longitudinal socket, $e$, a sliding pawl fitted within said socket to engage the teeth of the ratchet-wheel, a bolt inserted through the socket, and a slot in the sliding pawl to limit its movement, as and for the purpose set forth.

3. In a vehicle-starter, the combination, with a ratchet-wheel affixed to the axle, of a lever pivoted upon the axle and provided with a longitudinal socket, $e$, a sliding pawl movable laterally and longitudinally in the socket to clear the teeth of the ratchet-wheel, a bolt through the socket, and a slot in the pawl to limit its longitudinal movement, as and for the purpose set forth.

4. In a vehicle-starter, the combination, with a ratchet-wheel affixed to the axle, of a lever pivoted upon the axle and actuated by a draw-bar of the car, a pawl movable with the lever to engage the teeth of the ratchet, a spring or weight to retract the draw-bar wheel, a latch upon the platform to engage the draw-bar, and a stud upon the draw-bar to fit within the latch when the draw-bar is retracted, as and for the purpose set forth.

5. In a vehicle-starter, the combination, with a ratchet-wheel affixed to the axle, of a lever pivoted upon the axle and actuated by the draw-bar of the car, a pawl movable with the lever to engage the teeth of the ratchet-wheel, and a roller for sustaining the forward end of the draw-bar, as and for the purpose set forth.

In testimony whereof I have hereunto set my hand in the presence of two subscribing witnesses.

JAMES ZELIFF.

Witnesses:
L. LEE,
HENRY J. MILLER.